United States Patent [19]

Seinera et al.

[11] Patent Number: 4,889,879

[45] Date of Patent: * Dec. 26, 1989

[54] THERMOPLASTIC COMPOSITIONS WITH VERY HIGH CONTENT OF PULVERIZED MINERAL MATERIALS FOR INCORPORATION IN POLYMERS

[75] Inventors: Henry Seinera, Oullins; Patricia Luberne, Gennevilliers; Claude Stock, Champs-sur-Marne; Patrick Trouve, Clamart, all of France

[73] Assignee: Pluess Staufer AG, Oftringen, Switzerland

[*] Notice: The portion of the term of this patent subsequent to Feb. 7, 2006 has been disclaimed.

[21] Appl. No.: 77,286

[22] Filed: Jul. 24, 1987

[30] Foreign Application Priority Data

Jul. 30, 1986 [FR] France ................. 86 11239

[51] Int. Cl.$^4$ ............ C08K 9/04; C08K 3/00; C08K 5/00; C08K 5/09; C08L 23/08; C08L 23/28; C08L 23/02; C08L 51/06

[52] U.S. Cl. ...................... 524/13; 524/35; 524/130; 524/131; 524/132; 524/133; 524/134; 524/135; 524/140; 524/141; 524/142; 524/143; 524/144; 524/145; 524/156; 524/157; 524/158; 524/208; 524/218; 524/220; 524/238; 524/240; 524/243; 524/244; 524/259; 524/287; 524/288; 524/290; 524/291; 524/319; 524/320; 524/366; 524/423; 524/424; 524/427; 524/430; 524/437; 524/440; 524/445; 524/449; 524/451; 524/456; 524/504; 524/528; 524/579; 524/583; 524/586

[58] Field of Search ............... 524/130–135, 524/140–145, 156–158, 238, 240, 243–244, 208, 218, 220, 259, 287–288, 290–291, 300, 319–320, 366, 423, 424, 427, 432, 437, 440, 445, 449, 451, 456, 504, 528, 583, 585, 579, 13, 35, 430

[56] References Cited

U.S. PATENT DOCUMENTS

| | | | |
|---|---|---|---|
| 4,116,897 | 9/1978 | Huszar et al. | 524/217 |
| 4,153,587 | 5/1979 | Yui | 524/505 |
| 4,174,340 | 11/1979 | Lüders et al. | 524/425 |
| 4,187,210 | 2/1980 | Howard | 524/730 |
| 4,307,009 | 12/1981 | Lüders et al. | 524/157 |
| 4,309,333 | 1/1982 | Silberberg | 524/425 |
| 4,455,344 | 6/1984 | Matsuyama et al. | 428/406 |
| 4,722,858 | 2/1988 | Harbourne et al. | 524/436 |
| 4,803,231 | 2/1989 | Seinera et al. | 524/142 |

FOREIGN PATENT DOCUMENTS 114724 8/1984 European Pat. Off. .

*Primary Examiner*—Herbert J. Lilling
*Attorney, Agent, or Firm*—Oblon, Spivak, McClelland, Maier & Neustadt

[57] ABSTRACT

Coherent thermoplastic aggregates with very high content of pulverized mineral materials, composed of the said materials, of polyolefin polymers and/or copolymers, and possibly also of various familiar adjuvants, characterized by the fact that, in order for them to have both a volumetric mass close to or at most equal to the theoretical volumetric mass of the pulverized mineral substances entering into their composition and an excellent compatibility with redispersion polymers, the polymers and/or copolymers entering into the composition of the said aggregates in presence of a fluidizing agent are chosen within the group of thermoplastics with melting and/or softening point at least equal to 60° C. and index of fluidity at least 50 (measured according to the standard ASTM D 1238) of the polyolefin type, other than those containing a polar monomer.

17 Claims, No Drawings

THERMOPLASTIC COMPOSITIONS WITH VERY HIGH CONTENT OF PULVERIZED MINERAL MATERIALS FOR INCORPORATION IN POLYMERS

BACKGROUND OF THE INVENTION

1. Field of the Invention

This invention relates to thermoplastic compositions or thermoplastic aggregates having a very pulverized mineral material content.

2. Discussion of the Background:

Generally, and in keeping with the former practice, the preparation of thermoplastic granules or "master blends" has long been known. These are formed of a mineral material and/or pulverized organic substance, such as, for example, very finely ground calcium carbonate, kaolin, talc, aluminum hydrate, titanium dioxide, barium sulfate, zinc oxide . . . , possibly with various agents such as stabilizers, lubricants, plasticizers, cross linking agents, biocide agents, flame retardants, and of a thermoplastic polymer, which is generally a polyolefin with index of fluidity lower than 50, the mixture of these various constituents being subjected to thermal and mechanical actions of malaxation and extrusion.

To the present day, the professional has sought to alter the composition of the granules, increasing as much as possible and for economic reasons the proportion of mineral and/or organic material by using the most powerful malaxators. Today, despite numerous studies in this field, it is recognized that the portion of mineral matter introduced may not exceed 75% by weight of the granules, representing 100 parts by weight of polymer, without producing major inconveniences for the preparation and/or use of the resulting granules ("master blends"), of which the consequence in a non-homogeneous redispersion of the mineral matter in the redispersion polymers.

One of the major inconveniences which appears during use of mineral matter in elevated amount, near the aforesaid limits, is manifested by heterogeneity (regardless of the importance of malaxation) of the mixture formed from the mineral fill and the polymer, such as a polyolefin, which may result in production of granules with very heterogeneous composition, detrimental to their subsequent utilization. Often, the heterogeneity causes a decline in the mechanical characteristics of the plastics filled with such granules.

Another inconvenience, equally serious, occurs when the professional attempts to increase beyond measure the quantity of mineral substance in relation to the quantity of thermoplastic polymer used in the mixture, i.e., when he attempts to introduce more than 300 parts by weight of mineral fill per 100 parts by weight of polymer, for in this case the result upon malaxation of the constituents, depending on the type of malaxator used, is either an increase in mass of the mixture, producing a blockage of the malaxator with this is, e.g., a screw type, or a segregation of the constituents, manifested by inability to bind them, when the malaxator is the helical or rotor type.

Thus, it becomes inconceivable to use, i.e., to redisperse such heterogeneous compositions in redispersion thermoplastic polymers, without running the risk of producing plastics filled in very irregular manner, whose surface appearance and certain mechanical characteristics would be very markedly impaired, if not compromised.

Hence, it is confirmed that the composition of granulates in mineral matter, relative to the quantity of thermoplastic polymers, is naturally limited by virtue of the aforesaid serious disadvantages.

Accordingly, such difficulties have heretofore led the professional to search for any improvement that could be applied to the various constituents of these plastic compositions so that they can hold increasingly more mineral substances without producing the said disadvantages.

That is why many solutions have been published in the specialized literature to alleviate these serious disadvantages.

First, because mineral materials often have a hydrophilic nature, they have little compatability with any polymer, especially the readily hydrophobic ones. In the case of the readily hydrophobic polymers, it is known that the presence of hydrophilic mineral substances, in the quantities mentioned in the former practice, may result in deterioration of the mechanical characteristics of the filled polymers. To counteract this, the specialized literature has recommended suppressing the hydrophilic nature of mineral substances such as finely ground natural calcium carbonates by treating them with organic substances, forming an envelope compatible with the polymers.

In this way, natural calcium carbonates have been treated with agents chosen among the saturated or unsaturated carboxylic acids of medium or high molecular weight, such as butyric, lauric, oleic, and stearic acid, as well as agents among the alcohols of high molecular weight, transformed by combination into sulfonates, sulfates, or other compounds (FR 1 047 087). Yet is has been ascertained that use of calcium carbonate modified by such treatment does not allow increasing the quantity of mineral substance in the polymers to an appreciable extent.

Subsequently, it was proposed to create good compatability between the hydrophilic mineral substance and the hydrophobic polymer by introducing, during the preparation of the composition, a cross-linking agent to create a bridge between the mineral filler and the polymer, such agent being an organophosphorus compound of phosphonate or phosphonic acid type, such that the thermoplastic composition intended for grinding contains 90 to 20 parts by weight of a polyolefin with a low index of fluidity, 10 to 80 parts by weight of an alkaline earth carbonate, and 0.1 to 10 parts by weight of the cross-linking agent, relative to the mineral filler (DE 2735160 (=US 4,174,340)). However, it was found that use of such agent does not produce the anticipated benefits. In other words, the compatability between the hydrophilic mineral filler and the hydrophobic polyolefins is not sensibly improved, so that certain mechanical properties of the filled polymers still remain unsatisfactory.

It has also been proposed, in order to improve the compatability between the hydrophilic mineral substance and the hydrophobic polymer, to substitute for the aforesaid cross-linking agent an organosulfur compound, of the sulfuric ester or sulfonic acid type, or derivates thereof (EP 0 017 038 (=US 4,307,009)). But, while it has been found that use of this latter agent improves certain mechanical properties of the filled polymers, by the cross-linkage effect, for the recommended quantities of mineral substance, on the other hand the quantity of mineral substance remains limited to 80% by weight of the total mass at most, or to 400 parts by weight of mineral substance per 100 parts of the polymer and the cross-linking agent taken together.

In the same spirit, and to improve the operations of injection or extrusion molding of polymer compositions filled with more than 30% by weight (relative to the total mass) of mineral material, filled thermoplastic compositions have also been proposed (EP -A- 0 114 724), comprising an olefin polymer with index of fluidity (MFI) between 0.1 and 40, a mineral filler (30 to 90% by weight, relative to the total filling), and a so-called "processing aid", formed from a mixture of: (a) a metal salt of a carboxylic acid containing at least 6 carbon atoms and (b) esters of the said acid (a) or an organic phosphate or a lubricator.

But it has been found experimentally that the aforesaid polymer compositions (where the polymer has an index of fluidity between 0.1 and 40) cannot contain more than 80% by weight of mineral fill, without displaying a very disagreeable redispersion in the thermoplastic polymers and, accordingly, a decline in the mechanical properties, despite the presence of the so-called "processing aid."

It has also been proposed (US 4,455,344) to prepare granulates comprising:

(a) 60 to 90 parts by weight of a mineral fill with mean dimension comprised between 0.005 and 100 μm, (b) 5 to 35 parts by weight of a crystalline polyolefin of mean dimension comprised between 150 and 1000 μm, (c) 5 to 35 parts by weight of a linking agent, having a melting point at least 10° C. lower than that of the crystalline polyolefin.

To achieve such granulates, the proposed process consists in covering the crystalline polyolefin and/or the particles of the mineral fill with the linking agent, which forms an envelope assuring cohesion of the particles.

But it has been experimentally verified that the granulates prepared by the said process cannot sustain a concentration of mineral substance greater than 80% by weight, without producing a medicore redispersion in the polymers, even when using a mineral substance of medium high granulometry, such as 50 μm. This limit of 80% by weight becomes absolutely inaccessible and unrealistic as a result of a phase segregation which appears during the malaxation when the granulometry of the mineral filler is chosen within mean values below 50 μm, i.e., when the user employs a mean granulometry on the order of, e.g., 3 μm.

As the applicant has ascertained, such process does not permit a coherent paste-like mixture, that is to say, a mixture of identical composition throughout at the production temperature and with the means employed, but instead produces incoherent agglomerates, i.e., such with a composition generally different from one to another and with irregular dimensions, ultimately resulting in poor redispersion in the appropriate polymers.

Finally, with the purpose of improving specifically the mechanical characteristics of compositions made from thermoplastic polymers, compositions have been proposed (EP -A- 0 100 066) based on polar copolymers of the ethylene/vinylacetate type, with index fluidity between 0.1 and 400, preferably 0.1 to 50 (Standard ASTM D 1238, 190° C. -2.16 kg, diestock 2.09 mm), and/or polyolefin polymers.

These compositions also contain 40 to 90% by weight of mineral fillers (the density of which must be taken into account), relative to the total mass, and 0.05 to 5% by weight of surfactants, familiar to the professional, and may also contain agents such as plasticizers, thermoplastic natural rubbers, and size.

But while these polymer comonomer based filled compositions are very suitable for creation, by direct transformation, of soundproofing covers for automobiles, having specific mechanical properties, such is no longer the case when the desired end is not improvement of the mechanical properties, but the production of very heavily filled granulates ("master blends"), designed to be redispersed in a homogeneous monomer in all thermoplastic polymers.

For despite the presence of the surfactant and the use of a considerable percentage of polar polymer with high index of fluidity (MFI 400, e.g., for the aforesaid polymer), the presence of the polar comonomer does not enable production of homogeneous granulates having more than 80% by weight of mineral filler, such as can later be redispersed uniformly in redispersion polymers.

The same disadvantages are found when the polymer compositions contain only olefin polymers whose indexes of fluidity are below 10, as is noticeable in the application examples.

SUMMARY OF THE INVENTION

Aware of the aforesaid inconveniences, the inventors, in pursuing their research, have discovered and prepared, by a new combination of means known or unknown, plastic compositions or aggregates with very high content of pulverized mineral material, this pulverized material having a mean granulometry such that 95% has a dimension at least below 30 μm.

The invention concerns thermoplastic compositions or thermoplastic aggregates, essentially comprised of pulverized mineral materials in very high content, at least one thermoplastic polyolefin polymer and/or copolymer other than the polyolefins containing a polar monomer, in small quantity, having an elevated index of fluidity, and finally an agent fluidizing the mixture constituted by the pulverized mineral materials and the thermoplastic polymer and/or copolymer, these compositions or aggregates being intended for incorporation in thermoplastic polymers.

DETAILED DESCRIPTION OF THE PREFERRED EMBODIMENTS

The present invention therefore relates to coherent thermoplastic aggregates with very high content of pulverized mineral substances, comprised of the said substances, of polymers and/or copolymers, and possibly also of various familiar adjuvants, and which are characterized by the fact that, in order that their volumetric mass be near or at most equal to the theoretical volumetric mass of the pulverized mineral substances entering into their composition and that they simultaneously possess excellent compatability with redispersion polymers, the polymers and/or copolymers entering into the composition of the aforesaid aggregates are selected from the group of thermoplastics with melting and/or softening point at least equal to 60° C. and with index of fluidity at least 50 (measured as per standard ASTM D 1238), of the polyolefin type, other than polyolefins containing a polar monomer.

According to the standard ASTM D 1238, the index of fluidity characterizing the polymer and/or copolymer of the invention is the quantity of polymer and/or copolymer, expressed in grams per 10 minutes, which flows at a temperature selected within the interval bounded by the softening and transformation points (polyethylene 190° C., polypropylene 230° C.) under a given normalized load (2.16 kg for polyethylenes and polypropylenes) through a diestock of specified diameter (2.09 mm to 2.10 mm) during a measured time.

While the granulates as per the former practice are easily produced from mixtures containing pulverized mineral substances, at least one polyolefin polymer and/or copolymer, and possibly also various known adjuvants, it appears that the polymer and/or copolymer employed in their compositions are always selected from among those containing at least one polar comonomer and/or those having an index of fluidity below 50 under conditions of the cited ASTM standard. Hence, as has been verified, the use of such polymers does not allow production of granulates having a content of pulverized mineral substances greater than 80% by weight, for at such concentrations their redispersion becomes impossible, as it is not homogeneous within classical redispersion polymers, such as the polyolefins.

The aggregates according to the invention, containing within their composition a very high content of pulverized mineral substance, at least one polymer and/or copolymer, and possibly also various known adjuvants, are equally characterized by the fact that the polymers and/or copolymers entering into the composition of the aggregates and selected within the aforesaid group are employed in lesser amount in the aggregate, and in the presence of a fluidizing agent.

In practice, the thermoplastic aggregates according to the invention consist of:

(a) 19.99 to 4.05 parts by weight relative to the total mass of at least one thermoplastic polyolefin polymer and/or copolymer, other than the polyolefins containing a polar monomer, with a melting and/or softening point at least equal to 60° C. and with an index of fluidity at least 50 (standard ASTM D 1238), (b) 80 to 95 parts, preferably 85.7 to 92.3 parts by weight relative to total mass, of pulverized mineral substances, constituting 400 to 1900, preferably 600 to 1200 parts by weight per 100 parts by weight of the aforesaid thermoplastic polymer and/or copolymer, (c) finally, 0.01 to 0.95 parts by weight of a mix-fluidizing agent, relative to the total mass.

The polyolefin mass and/or copolymers (other than polar monomers), entering into the composition of the aggregates according to the invention, are chosen among those having a melting and/or softening point of at least 60° C. and an index of fluidity of at least 50, as per the standard ASTM, such as low density (linear or branched) or high density polyethylenes, homopolymer or copolymer propylenes, polybutylenes and the copolymers obtained by combinations during copolymerization of at least two of the monomers ethylene, propylene, and butylene, polyolefins modified by grafting or copolymerization, such as, e.g., the halogenated polyolefins, the EPDM modified polypropylenes, the SEBS modified polypropylenes, or two or more of the aforesaid polymers and/or copolymers in physical mixture.

However, the polyolefin polymers and/or copolymers appearing in the composition of the aggregates according to the invention are preferably selected among those having an index of fluidity of at least 200, and very preferably among those having an index of fluidity of at least 400, under the conditions of standard ASTM D 1238.

The pulverized mineral materials entering into the composition of the aggregates according to the invention may be of natural or synthetic origin, and may be added singly or in mixtures. They are generally chosen from among the mineral oxides and/or salts containing at least one metallic element, such as, e.g., alkaline earth carbonates like calcium carbonate, magnesium carbonate, zinc carbonate, dolomite; lime; magnesia; barium or calcium sulfate; aluminum hydroxides, silica, the clays and other aluminosilicates such as kaolin, talc, mica; metal oxides such as e.g., zinc oxide, the iron oxides, titanium dioxide, glass fibers or beads, wollastonite.

To these pulverized mineral materials can be added pulverized organic materials of natural or synthetic origin, such as, e.g., colorants, starch, cellulose fibers and meal, carbon fibers.

All these pulverized mineral materials can be used singly or in combinations, depending on the type of aggregate desired.

Preferably, the pulverized materials used in the invention have a dimension at least between 0.01 to 100 μm, more especially between 0.1 to 5 μm, the quantity of pulverized mineral materials introduced into the mixture depending not only on the nature of the said material and its granulometry, but also on its density The fluidizing agent used in the context of the invention corresponds to the general formula, containing at least one free acid functions:

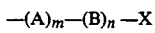

where (A) represents ethylene oxide, (B) represents propylene oxide, with (m+n) equal or greater than 0 and equal or less than 24, R is a linear or nonlinear alkyl radical, saturated or unsaturated, an aryl radical, an alkylaryl radical, a saturated or unsaturated heterocyclic compound containing 5 to 28 carbon atoms, preferably 8 to 24 carbon atoms, or a steroid radical, and the said radical R can be branched or not, and/or can carry one or more functional groups of the type halogen, —OH, —COOH, —COOR, —NO$_2$, —NH$_2$, —CONH$_2$, —CN, sulfonic, sulfuric, phosphonic, phosphonic, while X can be one of the radicals carboxylic, sulfonic, sulfuric, phosphonic, phosphonic.

In the case when X has several acid functions, at least one of them should remain free, the others being combined in a salt or esterified by means of an alcohol of formula R'—OH, where the radical R' can be a carbon chain containing 1 to 4 carbon atoms or one of the radicals pertaining to the pervious group defined by R. It is also possible that radical R' and radical R are identical.

As an example, we may specify for R radicals as diverse as n-hexyl, n-octyl, n-decyl, n-dodecyl, n-didecyldioxyethylene, n-tetradecyl, n-hexadecyl, n-hexadecyltrioxyethylene, n-octadecyl, n-octadecyloxyethylene, n-octylpentaoxyethylene, n-heptadecyl, phenyl, methyl-2 butyl-2, methyl-2 butyl-1, phenyl-3 propenyl-1, phenyl-1 propenyl, paranonylphenyl, dioxyethylene, paramethylphenyl, cyclohexyl, the cholesterol radical, Beta-naphthyl, radicals of the diols.

The various adjuvants of known type, which can also be introduced into the composition of the aggregates according to the invention, belong to the group composed of the thermal or photochemical stabilizers, lubricators, plasticizers, antistatics, flame retardants, metal passivators, such as cupropassivators.

In practice, the preparation of the aggregates as per the invention is done by means of processes and equipment familiar to be professional, comprising the stages of malaxation and granulation.

The stage of malaxation, which occurs in a mixer provided with a means of agitation and a means of heating, involves a treatment at the transformation temperature of the polyolefins (with index of fluidity at least 50), other than those containing a polar monomer, and a mixture of the components introduced successively or simultaneously into the malaxator under sufficient agitation. The temperature of transformation of the aforesaid polyolefins is generally between 60 and 300° C.

The malaxation can be done by using a malaxator of familiar type, such as, e.g., continuous or discontinuous internal malaxators, double screw extruders, high speed mixers.

The stage of granulation, which follows the stage of malaxation, enables a transformation of the hot mixture coming from the malaxator into aggregates by well known means, such as, e.g., extrusion through a diestock followed by a cutting, or calendering of a sheet and slicing, or by using granulating rollers. The aggregates produced according to the invention have a size which is favorably close to that of the granulates of the polymers in which they rae to be redispersed.

The aggregates according to the invention offer an excellent compatability of redispersion in thermoplastic polymers or copolymers, more especially in those chosen from the group composed of the homo or copolymer polyolefins, such as, e.g., the low or high density polyethylenes, the linear polyethylenes, the polypropylenes, the copolymers ethylene/propylene, ethylene/vinyl acetate, ethylene/acrylic acid, the halogenated polyethylenes such as chlorinated polyethylene, polybutene, polymethylpentene, polyisobutylene; the polystyrenes and their derivates, such as, e.g., the styrene/butadienes, the Acrylonitrile/Butadiene/Styrenes, the styrene/acrylonitriles, the styrene/butadiene/styrenes; the polyvinylchlorides; the polycarbonates; the saturated polyesters, such as the polyethylene terephthalates and/or polybutylene terephthalates; the polyphenylene oxides; the polyamides.

The redispersion of the aggregates according to the invention is done in a polymer and/or copolymer chosen by the user from the aforesaid group of polymers and/or copolymers, from prepared blends, and following the presently well know transformation methods.

Among the methods of transformation chosen, we may mention by way of example illustrating the invention, first, the extrusion of a film or a sheath, the extrusion of strips, or the extrusion coating of paper or metallic foils, where the prepared blends may contain, e.g., 1 to 30% by weight of aggregates relative to the total formulation. But we may also mention among the methods of transformation: injection, blowing of hollow shapes, extrusion of tubes, profiles or foils, fabrication of wires and cables, calendering, commencing with prepared blends which may contain 1 to 70% by weight of aggregates, relative to the total formulation.

Other features of the invention will become apparent in the course of the following descriptions of exemplary embodiments which are given for illustration of the invention and are not intended to be limiting thereof.

EXAMPLE 1

This example illustrates the preparation of aggregates according to the invention, making use of four different methods well known to the professional for this type of production.

FIRST METHOD OF PREPARATION

In a high speed mixer of type GUEDU, having an electrically heated vat of capacity of 4.5 liters, a mixture is prepared at temperature of 140? C., having the following composition in parts by weight:

| | |
|---|---|
| natural $CaCO_3$ | 880 |
| Millicarb, a product of the OMYA Company, having a specific surface of 2 square-meter gram-liters, a mean diameter of 3 $\mu$m, and a cut length of 10 $\mu$m, comprising 790 parts by weight per 100 parts polymer | |
| polyolefin polymer Vestoplast 3632 (HUELS Co.) with index of fluidity 800, measured at 140° C. under a load of 2.16 kg | 111.4 |
| fluidizing agent : alkylphosphonate of formula $C_{14}H_{29}$—$PO_3H_2$, comprising 0.91 parts per 100 parts of mineral substances | 8 |
| thermal stabilizer IRGANOX 1010 (CIBA-GEIGY) | 0.6 |

First, roughly on-third of the pulverized mineral material, represented by natural $CaCO_3$, with the polyolefin polymer according to the invention, the stabilizer, and the fluidizer are introduced into the chamber, heated to 140° C.

The mixture is subjected to the mechanical action of a vane, turning at the speed of 1500 rpm, while the temperature of the medium is maintained at 140° C.

Then, the remaining two-thirds of $CaCO_3$ are added to this mixture and the agitation is maintained until a homogeneous paste is obtained. The entire set of steps takes around 15 minutes.

The resulting paste is then calendered in the shape of plates, which are then sliced into tiny cubes having a dimension of 2 to 3 mm on a side, representing the aggregates as per the invention.

SECOND METHOD OF PREPARATION

Into a laboratory co-malaxator of type BUSS, PR 46, having an electrically heated malaxation zone, we introduce a mixture having the following composition in parts by weight:

| | |
|---|---|
| natural $CaCO_3$ | 900 |
| Millicarb, a product of the OMYA Co., having a specific surface of 2 square-meter gram-liters, a mean diameter of 3 $\mu$m, a cut length of 10 $\mu$m, representing 985 parts by weight per 100 parts of polymer | |
| polyolefin polymer Vestoplast 3632 (HUELS Co.) | 80 |

The final temperature of this mixture is 140° C. and the speed of rotation of the vanes is 90 rpm. Then, the resulting paste is subjected to the action of granulating rollers, thus producing the aggregates according to the invention.

EXAMPLE 2

This example illustrates the very good redispersion in polyolefin polymers of the aggregates according to the invention, prepared by methods 1 and 4 of Example 1.

For this, standard specimens (type ISO) were produced by injection, using a press NESTAL NEOMAT 170/90 with microprocessor control The closing force was 900 KN, the screw diameter 32 mm, and the length-/diameter ratio (L/D) was 18.8.

The principal parameters of regulation of the press were as follows:

the temperature of the material, between 200 and 240° C., depending on the redispersion polymer or copolymer used the nozzle temperature between 180 and 240° C., depending on the redispersion polymer or copolymer used the mold temperature, 40° C.

the maximum injection rate, 200 mm per second the injection pressure, 100 bars the length of the cycle was on the order of 62 seconds, comprising a cooling time of 30 seconds, an injection time of 2 seconds, a maintenance time of 25 seconds, and finally an interval between cycles of 5 seconds The press was successively supplied with polymers or copolymers alone, serving as controls, and with mixtures of the same polymers or copolymers, into which were introduced mineral substances by means of the aggregates of invention, or "master blends" chosen from the best currently on the market.

For each polymer or copolymer used for the redispersion test, the following formulations were produced:

pure polymer or copolymer polymer or copolymer filled with 20% and 40% by weight of pulverized mineral materials relative to the total formula, these mineral materials proceeding either from the aggregates of the invention or the "maser blends" well known to the professional.

In the case of the formulations containing pulverized mineral materials, the mixtures of polymers or copolymers with the aggregates of the invention or the "master blends" according to the common practice were produced at ambient temperature in a Tonneau type mixer.

Since it is well known that there exists a close relationship between the mechanical properties of a filled plastic and the quality of redispersion of the pulverized mineral substances in the redispersion polymer or copolymer, for a given proportion of filler, all the specimens produced by injection were subjected to testing of the mechanical properties, such as determination of the maximum force, the rupture force, the elongation at rupture, the modulus of elasticity in four-point flexure, and finally the Charpy impact at 0 and −23° C., the two mechanical properties most representative of good redispersion being the measured impact resistance and the elongation at rupture.

In a first group of experiments (1 to 5), the aggregates according to the invention were redispersed in a low density polyethylene sold by the ATOCHEM company under the name "LACQTENE 1070 MN 18", with index of fluidity (190° C., 2.16 kg) equal to 7.

Experiment 1 involves pure low density polyethylene, as above.

Experiment 2 involves the incorporation, in the aforesaid polymer, of 20% by weight of $CaCO_3$ Millicarb from a "master blend" marketed by the MULTIBASE company (France) under the brand LDPE 707 and known for its good redispersion qualities.

Experiment 3 concerns the incorporation, in the aforesaid polymer, of 20% by weight of $CaCO_3$ from the aggregate as per the invention, produced by Method 1 of Example 1.

Experiment 4 concerns the same type of formulation as Experiment 2, but contains 40% by weight of $CaCO_3$ from the "master blend" LDPE 707 of MULTIBASE.

Experiment 5 concerns the same type of formulation as Experiment 3, but contains 40% by weight of $CaCO_3$, provided by the aggregate as per the invention, produced by Method 1 of Example 1.

All the results relative to the measured mechanical properties are summarized in Table I below:

TABLE I

| | LOW DENSITY POLYETHYLENE | | | | |
|---|---|---|---|---|---|
| | Experiment No. | | | | |
| | 1 | 2 | 3 | 4 | 5 |
| | Pure Polymer | F.P. | INV | F.P. | INV |
| % of $CaCO_3$ | 0 | 20 | 20 | 40 | 40 |
| Max force, N/square-mm | 10 | 10 | 9.6 | 10 | 8.7 |
| Rupture force, N/square-mm | 9.7 | 9.5 | 9.2 | 9.5 | 8.5 |
| Elongation at rupture, % | 210 | 153 | 160 | 95 | 105 |
| Modulus of elasticity, 4-point flexure, N/square-mm | 120 | 160 | 145 | 240 | 195 |
| Charpy impact, mJ/square-mm at 0° C. | NC | NC | NC | NC | NC |
| at −23° C. | NC | NC | NC | NC | NC |

Legend: F.P. = former practice, INV = invention, NC = no failure

In a second group of experiments (6–10), the aggregates according to the invention were redispersed in linear low density polyethylene with index of fluidity 2.3 (&90? C., 2.16 kg).

Experiment 6: pure polymer.

Experiment 7: incorporation of 20% weight of $CaCO_3$ Millicarb from the OMYA company (having the same characteristics as the aforementioned), using "master blend" LDPE 707 A of MULTIBASE.

Experiment 8: incorporation of 20% by weight of $CaCO_3$ Millicarb, using the aggregates according to the invention, produced by Method 4 of Example 1.

Experiment 9: incorporation of 40% by weight of $CaCO_3$ Millicarb, using "master blend" LDPE 707 A of MULTIBASE.

Experiment 10: incorporation of 40% by weight of $CaCO_3$ Millicarb, using the aggregates according to the invention, as specified in Experiment 8.

All the results regarding the measured mechanical properties have been summarized in Table II below:

TABLE II

| | LINEAR LOW DENSITY POLYETHYLENE | | | | |
|---|---|---|---|---|---|
| | Experiment No. | | | | |
| | 6 | 7 | 8 | 9 | 10 |
| | Pure Polymer | F.P. | INV | F.P. | INV |
| % of $CaCO_3$ | 0 | 20 | 20 | 40 | 40 |
| Max force, N/square-mm | 17 | 17.8 | 17.2 | 14.4 | 11.4 |
| Rupture force, N/square-mm | 16.6 | 17.7 | 16.4 | 14.4 | 10.9 |
| Elongation at rupture, % | 510 | 552 | 560 | 182 | 240 |
| Modulus of elasticity, 4-point flexure, N/square-mm | 200 | 240 | 230 | 410 | 310 |
| Charpy impact, mJ/square-mm at 0° C. | NC | NC | NC | NC | NC |

TABLE II-continued
LINEAR LOW DENSITY POLYETHYLENE

| | Experiment No. | | | | |
|---|---|---|---|---|---|
| | 6 Pure Polymer | 7 F.P. | 8 INV | 9 F.P. | 10 INV |
| at −23° C. | NC | NC | NC | NC | NC |

Legend: F.P. = former practice, INV = invention, NC = no failure

In a third group of experiments (11 to 13) the aggregates according to the invention were redispersed in high density polyethylene (HOECHST: Hostalene GC 7260) with index of fluidity 8 (190° C., 2 16 kg).

Experiment 11: pure polymer.

Experiment 12: incorporation of 20% by weight of CaCO₃ Millicarb, using "master blend" LDPE 707 A of MULTIBASE.

Experiment 13: incorporation of 20% by weight of CaCO₃ Millicarb, using the aggregates according to the invention, prepared by Method 1 of Example 1.

All the results regarding the measured mechanical properties have been summarized in Table III below:

TABLE III
HIGH DENSITY POLYETHYLENE

| | Experiment No. | | |
|---|---|---|---|
| | 11 Pure Polymer | 12 F.P. | 13 INV |
| % of CaCO₃ | 0 | 20 | 20 |
| Max force, N/square-mm | 26 | 21 | 21 |
| Rupture force, N/square-mm | 10.4 | 9.4 | 11 |
| Elongation at rupture, % | 92 | 100.5 | 115 |
| Modulus of elasticity, 4-point flexure, N/square-mm | 1020 | 1370 | 1050 |
| Charpy impact, mJ/square-mm at 0° C. | NC | NC | NC |
| at −23° C. | NC | NC | NC |

Legend: F.P. = former practice, INV = invention, NC = no failure

In a fourth group of experiments (14 to 18), the aggregates according to the invention were redispersed in homopolymer polypropylene (I.C.I. Propatene GYM 45) with index of fluidity 15 (230° C., 2.16 kg), in comparison to a "master blend" of the familiar practice.

Experiment 14: pure polymer.

Experiment 15: polymer filled with 20% by weight of CaCO₃ Millicarb, using "master blend" PPH 7012 A of MULTIBASE.

Experiment 16: polymer filled with 20% by weight of CaCO₃ Millicarb, using the aggregates according to the invention, produced by Method 4 of Example 1.

Experiment 17: polymer filled with 40% by weight of CaCO₃ Millicarb, as in Experiment 15.

Experiment 18: polymer filled with 40% by weight of CaCO₃ Millicarb, as in Experiment 16.

As the results regarding the measured mechanical properties have been summarized in Table IV below:

TABLE IV
HOMOPOLYMER POLYPROPYLENE

| | Experiment No. | | | | |
|---|---|---|---|---|---|
| | 14 Pure Polymer | 15 F.P. | 16 INV | 17 F.P. | 18 INV |
| % of CaCO₃ | 0 | 20 | 20 | 40 | 40 |
| Max force, N/square-mm | 24.6 | 31 | 30 | 23 | 21 |
| Rupture force, N/square-mm | 17 | 26 | 23 | 18 | 16 |
| Elongation at rupture, % | 83 | 36 | 45 | 64 | 67 |
| Modulus of elasticity, 4-point flexure, N/square-mm | 1257 | 1814 | 1550 | 2431 | 1800 |
| Charpy impact, mJ/square-mm at 0° C. | 46 | 31.70 | 36 | 19.60 | 23 |
| at −23° C. | 11 | 20.40 | 20 | 13.30 | 15 |

Legend: F.P. = former practice, INV = invention, NC = no failure

In a fifth group of experiments (19 to 23), the aggregates according to the invention were redispersed in a copolymer polypropylene (HOECHST: Hostalene PPR 1042) with index of fluidity 4 (230° C., 2.16 kg), in comparison to a "master blend" of the familiar practice.

Experiment 19: pure polymer.

Experiment 20: polymer filled with 20% by weight of CaCO₃ Millicarb, using "master blend" PPC 7012 A of MULTIBASE.

Experiment 21: polymer filled with 20% by weight of CaCO₃ Millicarb, using the aggregates according to the invention, produced by Method I of Example 1.

Experiment 22: polymer filled with 40% by weight of CaCO₃ Millicarb, as in Experiment 20.

Experiment 23: polymer filled with 40% by weight of CaCO₃ Millicarb, as in Experiment 21.

All the results regarding the measured mechanical properties have been summarized in Table V below:

TABLE V
ETHYLENE PROPYLENE COPOLYMER

| | Experiment No. | | | | |
|---|---|---|---|---|---|
| | 19 Pure Polymer | 20 F.P. | 21 INV | 22 F.P. | 23 INV |
| % of CaCO₃ | 0 | 20 | 20 | 40 | 40 |
| Max force, N/square-mm | 26 | 23 | 22 | 19 | 19 |
| Rupture force, N/square-mm | 12 | 19 | 18 | 15 | 15 |
| Elongation at rupture, % | 294 | 200 | 260 | 137.5 | 195 |
| Modulus of elasticity, 4-point flexure, N/square-mm | 990 | 1350 | 1170 | 1782 | 1300 |
| Charpy impact, mJ/square-mm at 0° C. | NC | 62 | NC | 50 | NC |
| at −23° C. | NC | 21.30 | 40 | 16.5 | 30 |

Legend: F.P. = former practice, INV = invention, NC = no failure

Examination of the 5 aforementioned tables shows that, for all the experiments concerning redispersion of the aggregates according to the invention, the characteristics of elongation at rupture and of impact are at least equal, if not superior, to the same characteristics determined in the specimens of "master blends" in the familiar practice Thus, it appears that the redispersion of the aggregates according to the invention is excellent, despite the elevated proportion of pulverized mineral substances in the aggregates.

EXAMPLE 3

This example illustrates, the same as Example 2, the excellent redispersion in polyolefin polymers of the aggregates according to the invention, prepared by Method 1 of Example 1 and containing 88% by weight of CaCO₃ (Millicarb), representing 790 parts by weight per 100 parts by weight of polyolefin polymer and/or copolymer, according to the invention, with an index of fluidity at least 50.

For this purpose, a film of 20 μm thickness was extruded by means of an ANDOUART machine, with a screw of diameter D =40 mm, a length equaling 18D, a diestock of diameter 130 mm, and a clearance of 0.5 mm. The speed of rotation of the screw was 50 to 70 rpm, the extrusion temperature was 190°C., and the rotation of inflation was 2.4.

The ANDOUART machine was supplied successively with the redispersion polymer alone (Experiment 24), serving as a reference, and with a mixture formed by the same polymer and a mineral fill, introduced by means of the aggregates according to the invention (Experiment 25).

Experiment 24 was carried out with a low density polyethylene with index of fluidity 2 (190° C., 2.16 kg), marketed by ESSO under the brand Escorene LD 104.

Experiment 25 was conducted with a mixture formed of the same polyethylene and $CaCO_3$ (Millicarb), in a ratio of 10% by weight, incorporated by means of the aggregates according to the invention, produced by Method 2 of Example 1.

In this manner, it was possible to extrude a film of pure polymer 20 μm thick in an internal of 30 minutes, without producing breakage (Experiment 24).

In the same way, and during an equivalent time, it was possible to produce a film with the filled polyethylene (Experiment 25), without causing breakage.

The absence of all laceration from the resulting sheath during examination by the naked eye and by a binocular magnifying glass corroborated the absence of agglomerations in the same film and indicated an excellent redispersion of the aggregate according to the invention.

EXAMPLE 4

This example illustrates, the same as Examples 2 and 3, the use of a different means of extrusion in order to observe and verify the good redispersion of the aggregates according to the invention in the polyolefins traditionally caused by the processing industry.

For this purpose, a band 3 mm thick was extruded through a draw plate by means of a single-screw TOREY extruder, having a screw of diameter D =25 mm, a length of 15D, and a draw plate of length 16 mm and height 2.5 mm. The speed of rotation of the screw was 50 rpm, the compression ratio was 3, and the temperature of extrusion was 170° C. for polyethylene and 210° C. for polypropylene copolymer.

The extruder was successively supplied with the redispersion polymer and copolymer alone (Experiments 26 and 29), serving as references, and with mixtures formed of the same polymer or copolymer and a mineral filler, introduced in the form of granulates pertaining to the public domain (Experiments 27 and 30), and the aggregates according to the invention (Experiments 28 and 31), incorporating 1% by weight of $CaCO_3$ relative to the total mass.

Experiment 26 was carried out with a low density polyethylene with index of fluidity 7 (190° C., 2.16 kg) (ATOCHEM: LACQTENE 1070 MN 18), while Experiment 29 was done with a polypropylene copolymer with index of fluidity 5 (230° C., 2.16 kg) (ATOCHEM: LACQTENE 3050 MN 4).

Experiment 27 involves the redispersion (in the polyethylene of Experiment 26) of 1% by weight of $CaCO_3$ Millicarb, incorporated in the form of a "master blend" LDPE 707 A (MULTIBASE), while Experiment 30 concerns the redispersion of 1% by weight of the same $CaCO_3$ in the polypropylene copolymer of Experiment 29, using the same "master blend."

Experiment 28 concerns the redispersion, in the polyethylene of Experiment 26, of 1% by weight of $CaCO_3$ (Millicarb), incorporated in the form of the aggregates according to the invention, prepared by Method 3 of Example 1, whereas Experiment 31 concerns the redispersion of 1% by weight of the same $CaCO_3$ in the polypropylene copolymer of Experiment 29, using the same aggregates of the invention.

Examination with a glass of magnification 50 revealed an excellent redispersion of the aggregates according to the invention (absence of agglomerates), better than the redispersion obtained with the "master blends" of the familiar practice.

EXAMPLE 5

This example illustrates the excellent compatability of the aggregates according to the invention with redispersion polymers other than the polyolefins, such as polystyrene, ABS, polyamide. For this, standardized specimens were prepared by injection, using the press NESTAL NEOMAT 170/90, described in Example 2.

In a first group of Experiments (32 to 34), polystyrene was injected at temperature of 240° C.

Experiment 32 concerns injection of pure styrene (Hostyrene N 4000 of HOECHST), with index of fluidity 4.5 (200° C., 5 kg).

Experiment 33 concerns incorporation in the aforesaid polystyrene of 20% by weight of $CaCO_3$ (Millicarb), using a "master blend" of the familiar practice (PS 600 A of MULTIBASE).

Experiment 34 concerns incorporation in the said polystyrene of 20% by weight of $CaCO_3$ (Millicarb), using the aggregates according to the invention, prepared by Method 1 of Example 1.

All the results regarding the measured mechanical properties have been summarized in Table VI below:

TABLE VI

| | POLYSTYRENE | | |
|---|---|---|---|
| | Experiment No. | | |
| | 32 | 33 | 34 |
| | Pure Polymer | F.P. | INV |
| % of $CaCO_3$ | 0 | 20 | 20 |
| Max force, N/square-mm | 49 | 36 | 41 |
| Rupture force, N/square-mm | 46 | 35 | 35 |
| Elongation at rupture, % | 7.5 | 11 | 14 |
| Modulus of elasticity, 4-point flexure, N/square-mm | 2840 | 3530 | 3200 |
| Charpy impact, mJ/square-mm at 0° C. | 19 | 18 | 19 |
| at −23° C. | 21 | 17 | 19 |

Legend: F.P. = former practice, INV = invention

In a second group of experiments (35 and 36), polyamide was injected at temperature of 240? C.

Experiment 35 concerns injection of a pure polyamide (BASF - Ultramid B 3 K) with and index of fluidity 2.6 (220° C., 2.16 kg).

Experiment 36 concerns incorporation in the mentioned polymer of 20% by weight of $CaCO_3$ (Millicarb), using the aggregates according to the invention, prepared by Method 1 of Example 1.

All the results regarding the measured mechanical properties have been summarized in Table VII below:

TABLE VII

|  | Experiment No. | |
|---|---|---|
|  | 35 Pure Polymer | 36 INV |
| % of CaCO$_3$ | 0 | 20 |
| Max force, N/square-mm | 49 | 50 |
| Rupture force, N/square-mm | 61 | 43 |
| Elongation at rupture, % | 310 | 90 |
| Modulus of elasticity, 4-point flexure, N/square-mm | 1620 | 2200 |
| Charpy impact, mJ/square-mm at 0° C. | NC | 74 |
| at −23° C. | NC | 45 |

Legend: INV = invention, NC = no failure

Examination of the aforementioned Table VI reveals that, for all the experiments regarding the redispersion of the aggregates according to the invention, the characteristics of elongation at rupture and impact are at least equal, if not superior, to the same characteristics determined on specimens of "master blends" of the familiar practice As for Table VII, the aforementioned experiment concerns the redispersion in polyamides of solely the aggregates according to the invention, as the familiar practice offers no "master blend" allowing comparative experiments.

Examination of the injected specimens and their mechanical characteristics indicates excellent redispersion in the polyamides of the mineral substances introduced by the aggregates according to the invention.

It therefore emerges that the redispersion of the aggregates according to the invention is excellent in polymers other than the polyolefins, and this despite the elevated proportion of pulverized mineral substances in the aggregates.

In other words, the aggregates according to the invention have proven themselves compatible with various thermoplastic redispersion polymers, contrary to the case of the granulates or "master blends" of the familiar practice, which are generally compatible only with the polymers entering into their composition.

EXAMPLE 6

This example illustrates the production of aggregates containing a progressive weight percentage of mineral substance within the framework of the invention, such aggregates after their production being coherent, with a plastic appearance, and easily redispersible in any of the aforementioned redispersion polymers and/or copolymers.

For this, seven mixtures were produced (experiments 37 to 43). The compositions of these various mixtures are summarized in Table VIII below:

TABLE VIII

|  |  | Experiment No. | | | | | | |
|---|---|---|---|---|---|---|---|---|
|  |  | 37 | 38 | 39 | 40 | 41 | 42 | 43 |
| Proportion of CaCO$_3$ | in parts by weight relative to the total mixture | 750 | 800 | 750 | 800 | 850 | 880 | 900 |
|  | in parts per 100 parts of polymer | 300 | 400 | 309 | 416 | 599 | 786 | 985 |
| Polymer | in parts by weight relative to the total mixture | 250 | 200 | 243 | 192.5 | 142 | 112 | 91.4 |
| Fluidizer | in parts by weight relative to the total mixture | 0 | 0 | 7 | 7.5 | 8 | 8 | 8 |

The CaCO$_3$ used was Millicarb.
The polymer introduced was Vestoplast 3632 of HULS, with index of fluidity 800 (140° C, 2.16 kg).
The fluidizer was an alkylphosphonate $C_{14}H_{29}PO_3H_2$.

These various mixtures were prepared in the same procedure as method 2 of example 1.

In certain of the experiments 37 to 43, measurements were taken of the index of fluidity, at a temperature of 140° C., under a load of 2.16 kg, with a diestock of diameter 2.09 mm, and of the actual volumetric mass of the aggregates according to the invention, as compared to the theoretical volumetric mass.

All the results regarding these various experiments have been summarized in Table IX below.

TABLE IX

|  | Experiment No. | | | | |
|---|---|---|---|---|---|
|  | 37 | 38 | 41 | 42 | 43 |
| Proportion of CaCO$_3$ in parts by weight relative to the total mixture | 750 | 800 | 850 | 880 | 900 |
| Index of fluidity in g per 10 minutes | 23.5 | 0 | 25 | 0.5 | 0.1 |
| Actual measured volumetric mass | 1.76 | 1.88 | 2.04 | 2.12 | 2.10 |
| Calculated (theoretical) volumetric mass | 1.76 | 1.89 | 2.05 | 2.15 | 2.27 |

This table shows the efficacy, in the preparation of the aggregates, of combining a polyolefin polymer of fluidity index at least 50 with a fluidizer.

It also indicates, by comparing the actual measured volumetric mass and the theoretical mass, that the aggregates are well formed of a plastic and coherent paste, which demonstrates that the polymer and/or copolymer according to the invention serves at most to fill the interstices between the particles of the highly compact structure formed by the pulverized mineral substances.

All of the aggregates pertaining to the invention have displayed an excellent redispersion in the abovementioned redispersion polymers and/or copolymers, this redispersion proving superior to that of the "master blends" of the former practice, even when the quantities of pulverized mineral substances are much greater (985 parts by weight per 100 parts of polymer) than the maximum used in the former practice (400 parts by weight per 100 parts polymer). The method used to test the redispersion was that described in example 3 (extrusion of a film 20 μm thick).

EXAMPLE 7

This example illustrates the production of aggregates as per the invention, containing various pulverized mineral substances such as talc, aluminum hydrate, calcined kaolin, titanium dioxide.

All the aggregates (experiments 44 to 53) were prepared according to the procedure described in method 2 of Example 1.

For all of these experiments, the polyolefin polymer as per the invention with an index of fluidity at least equalling 50 was a mixture of Vestoplast 3632 (HULS Co.) and Vestowax H2 (polyethylene wax of the HULS Co.) in the weight proportion of 95% of the first and 5% of the second.

The fluidizer, which was the same for all experiments, was an alkylphosphonate of formula $C_{14}H_{29}PO_3H_2$.

The control experiments 44, 47, 49 and 51, pertaining to talc, kaolin, and aluminum hydrate, were very difficult to accomplish, if not impossible, at 800 parts by weight with respect to the total formula, in the absence of the new combination comprised of at least one polyolefin with index of fluidity at least 50 and the fluidizer.

The thus prepared aggregates were subjected to a measurement of the index of fluidity according to standard ASTM D 1238, using two temperature/load combinations (140° C., 2.16 kg) and (190° C., 5 kg) and keeping the same diestock.

All data regarding the composition of the aggregates and the results of the measured index of fluidity are summarized in Table X below.

TABLE X

| Mineral material | Experiment | A | B | C | Index of fluidity 140° C. 2.16 kg | 190° C. 5 kg |
|---|---|---|---|---|---|---|
| Talc | 44 | 800 | 416 | 0 | not measurable | |
| OOS | 45 | 800 | 416 | 7.5 | — | 88 |
| Talcs de LUZENAC | 46 | 850 | 599 | 8 | not measurable below 10 kg | |
| Aluminum hydrate | 47 | 800 | 416 | 0 | mixture not possible | |
| OL 104 MARTINS-WERK Co. | 48 | 800 | 416 | 8 | — | 0.1 |
| Kaolin | 49 | 800 | 416 | 0 | mixture not possible | |
| Calcined Whitetex FREEPORT Co. | 50 | 800 | 416 | 8 | not measurable below 10 kg | |
| TiO2 | 51 | 800 | 416 | 0 | 1.9 | — |
| RL 90 | 52 | 800 | 416 | 8 | 210.00 | — |
| THANN & MULHOUSE | 53 | 870 | 717 | 8.7 | — | 8 |

Legend: Column A - parts by weight of mineral substances relative to total mixture; Column B - parts by weight of mineral substances per 100 parts by weight of polymer; Column C - parts by weight of fluidizer relative to total mixture.

The aggregates according to the invention in experiments 45, 46, 48, 50, 52 and 53 were subjected to redispersion tests, as described in examples 2 and 4.

Whatever the pulverized mineral substance used, all the aforesaid aggregates belonging to the domain of the invention displayed an excellent redispersion in polymers and copolymers as different as the polyvinyl chlorides, the saturated polyesters (such as polyethylene terephthalate), and the polycarbonates.

For this purpose, a band 2 mm thick was extruded through the die plate, using a single-screw GOETTFERT extruder, which has a screw of diameter D=30 mm and a length of 25 D. The extrusion was done at the traditional conversion temperatures of the various redispersion polymers.

The bands thus produced had good surface appearance and good elasticity. From these bands, films 100 μm thick were made, using a hot compression press.

Examination of these films with a binocular glass (magnification 50) reveals very good homogeneity of the film and no agglomerations.

Obviously, numerous modifications and variations of the present invention are possible in light of the above teachings. It is therefore to be understood that within the scope of the appended claims, the invention may be practiced otherwise than as specifically described herein.

What is claimed as new and desire to be secured by Letter Patent of the United Sates is:

1. A coherent thermoplastic aggregate composition comprising:
   (a) 19.99 to 4.05 parts by weight, relative to the total mass, of at least one thermoplastic polyolefin polymer of copolymer of both, not containing polar monomers, having a melting or softening point at least equal to 60° C. and index of fluidity at least 50;
   (b) 80 to 95 parts by weight, relative to the total mass of a pulverized mineral material, representing 400 to 1900 parts by weight per 100 parts be weight of said polymer or copolymer or both; and
   (c) 0.01 to 0.95 parts by weight of a fluidizing agent, relative to the total mass of the mixture, wherein said fludizing agent corresponds to the formula:

$$R-(A)_m-(B)_n-X$$

containing at least one free acid function, where X is a carboxylic, sulfonic, sulfuric, phosphonic or phosphonic radical, (A) is ethylene oxide, (B) is propylene oxide, with (m+n) equal to or greater than 0 and equal to or less than 24, wherein R is a linear or nonlinear, saturated or unsaturated alkyl radical, aryl radical, alkyl-aryl radical, or heterocyclic compound, saturated or not, containing from 5 to 28 carbon atoms, or a steroid 2. The coherent thermoplastic aggregate composition of claim 1, wherein said thermoplastic polymer or copolymer or both has a melting or a softening point of at least 60° C. and an index of fluidity of at least 200.

3. The coherent thermoplastic aggregate composition of claim 1, characterized by the fact that said polyolefin polymer or copolymer, not containing polar monomers, comprises a low density polyethylene, a linear or branched, or high density polyethylene, a homopolymer or copolymer polypropylene, a polybutylenes, a copolymer of at least two of the monomers ethylene, propylene, and butylene, or a polyolefin modified by grafting or copolymerization.

4. The coherent thermoplastic aggregate composition of claim 3, wherein the polyolefin modified by grafting or copolymerization is a halogenated polyolefin, an EPDM modified polypropylene, or a SEBS modified polypropylene.

5. The coherent thermoplastic aggregate composition of claim 3, wherein said polyolefin polymer or copolymer not containing polar monomers is obtained by mixing together at least two of them.

6. The coherent thermoplastic aggregate composition of claim 1, wherein said pulverized mineral material entering into the composition singly or in a blend is a mineral oxide or a salt containing at least one metallic element.

7. The coherent thermoplastic aggregate composition of claim 6, wherein said pulverized mineral material is an alkaline earth carbonate, a magnesium carbonate, a zinc carbonate, dolomite, lime, magnesia, a sulfate of barium or calcium, an aluminum hydroxide, silica, kaolin, talc, mica, an oxide of zinc, iron, titanium, a glass fiber or bead, or wollastonite.

8. The coherent thermoplastic aggregate composition of claim 1, wherein a pulverized organic material of natural or synthetic origin is added to said pulverized mineral material.

9. The coherent thermoplastic aggregate composition of claim 1 or 8, wherein said pulverized mineral material or said organic material has a dimension of between 0.01 and 100 μm.

10. The coherent thermoplastic aggregate composition of claim 1, wherein, when X contains several acid functions, at least one of them is free, the others being combined into salts or esterified by an alcohol of formula R'—OH, where R' is a carbon chain containing from 1 to 4 carbon atoms and one of the radical is R.

11. The coherent thermoplastic aggregate composition of claim 1, wherein R contains at least one functional group which is a halogen, -OH, -COOH, —COOR, —NO$_2$, —NH$_2$, —CONH$_2$, —CN, sulfonic, sulfuric, phosphonic, or phosphonic group.

12. The coherent thermoplastic aggregate composition of claim 1, wherein R' is identical to R.

13. The coherent thermoplastic aggregate composition of claim 1, comprising 85.7 to 92.3 parts by weight of component (B), relative to the total mass of said pulverized mineral material, representing 600 to 1200 parts by weight per 100 parts by weight of said polymer or copolymer or both.

14. The coherent thermoplastic aggregate composition of claim 2, wherein said thermoplastic polymer or copolymer or both has an index of fluidity of at least 400.

15. The coherent thermoplastic aggregate composition of claim 8, wherein said pulverized organic material of natural or synthetic origin is a colorant, starch, a cellulose fiber, a cellulose meal, or a carbon fiber.

16. The coherent thermoplastic aggregate composition of claim 9, wherein said pulverized mineral material or said organic material has a dimension of between 0.1 and 5 μm.

17. The coherent thermoplastic aggregate composition of claim 11, wherein R contains at least one functional group which is fluorine, chlorine, bromine, or iodine.

* * * * *